Figure 6:
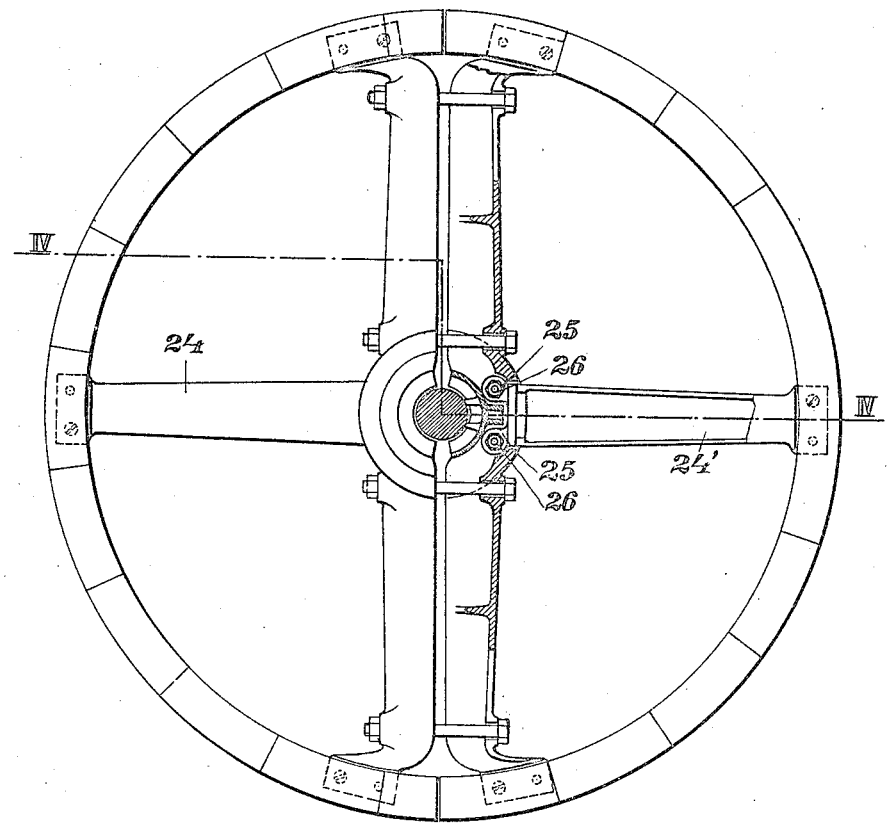

Apr. 3, 1923.
H. WOTTLE
1,450,880
SPLIT BELT PULLEY
Filed May 6, 1922     2 sheets-sheet 1
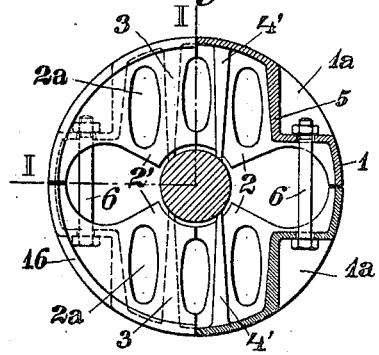
Fig.1.
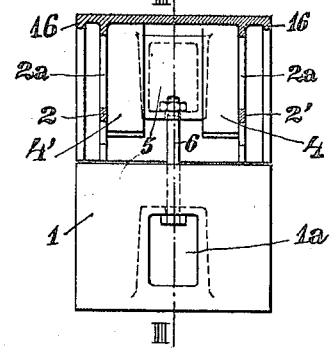
Fig.2.
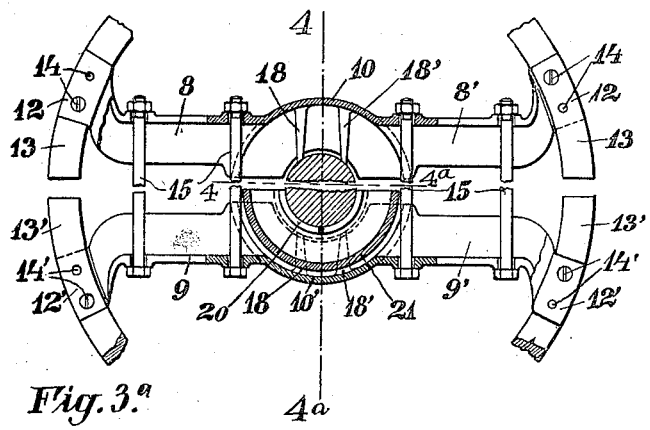
Fig.3.
Fig.3.ª
Fig.5.
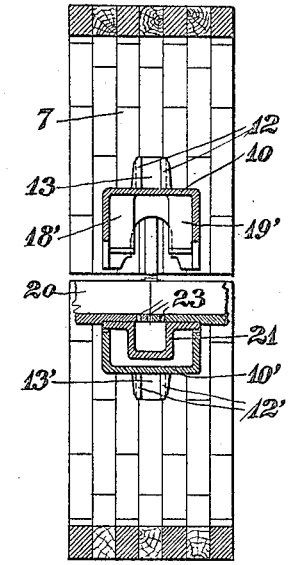
Fig.4.
Fig.4.ª
Inventor
H. Wottle,
By Marks&Clerk
Attys Apr. 3, 1923.

H. WOTTLE

SPLIT BELT PULLEY

Filed May 6, 1922

1,450,880

2 sheets-sheet 2

Inventor
H. Wottle,
By Marks & Clerk
Attys

Patented Apr. 3, 1923.

1,450,880

UNITED STATES PATENT OFFICE.

HANS WOTTLE, OF VIENNA, AUSTRIA.

SPLIT BELT PULLEY.

Application filed May 6, 1922. Serial No. 559,102.

*To all whom it may concern:*

Be it known that I, HANS WOTTLE, citizen of the Republic of Austria, residing at 11 Arenbergring, Vienna, III, Austria, have invented certain new and useful Improvements in and Relating to a Split Belt Pulley, of which the following is a specification.

This invention relates to split belt-pulleys and has for its object the construction of a pulley, the bore of which may easily be adapted to suit any diameter of shaft, and which, when desired, may easily be provided with a bushing for free running. Furthermore the invention aims at simplifying the manner of fastening a wooden rim to the arms.

In order that the bore of a pulley otherwise finished may be adapted to suit any diameter of shaft the hub does not consist of a bushlike body, but is constituted by a number of ribs or plates, some of which are arranged parallel to the axis of the bore, whilst two or more other plates are disposed transversally. The bore is made of a slightly smaller diameter than that of the shaft, so that the tilled end faces of the parallel ribs are very strongly pressed against the shaft and bitingly engage its surface, when the two halves of the pulley are screwed together, keys or other means for fastening the pulley being thus rendered superfluous.

A fast pulley provided with such ribs may easily be converted into a loose pulley by simply enlarging the bore and inserting a bushing.

The arms or spokes of such pulleys designed for being provided with a wooden rim may be split longitudinally in order to obtain a certain degree of elasticity, their ends forming laps and together a fork, by means of which the split arm is secured to one of the segments of the wooden rim. By this arrangement a durable connection is obtained and the mounting facilitated even in such cases, where the thickness of the segment is not very exact.

For pulleys of greater diameter, the arms of which form a cross, the second pair of arms may be made separately and mounted in a very simple manner. Such inserted arms may be made hollow or consist of two parts forming together a hollow body.

In the drawing different forms of embodiment of the invention are shown,

Fig. 1 being an elevation (half sectional) of the simplest form,

Fig. 2 a view of the same (half sectional) seen at a right angle,

Fig. 3 is a fragmentary sectional view of a pulley with a wooden rim, the pulley being mounted on a shaft, Fig. 3$^a$ is a similar view showing the pulley provided with a bushing for free rotation and with an oil-chamber, Fig. 4 is a cross section taken on line 4—4 of Fig. 3, Fig. 4$^a$ is a cross section taken on line 4$^a$—4$^a$ of Fig. 3$^a$, Fig. 5 is a horizontal sectional view of the arrangement shown in Fig. 3$^a$.

Fig. 6 an elevation, partly sectional, of a pulley with four arms and

Figure 7:
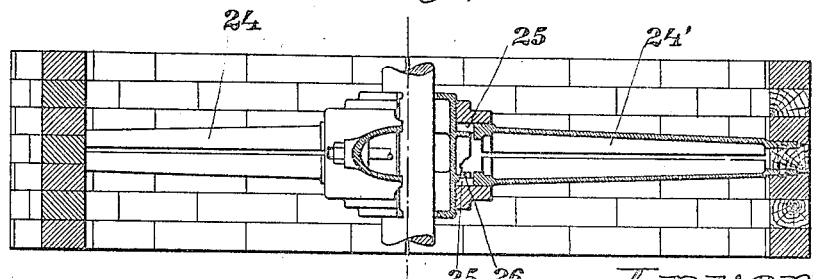

Fig. 7 a sectional view in the plane IV—IV as indicated in Fig. 6.

The pulley of sectional formation as shown in Figs. 1 and 2 is one of smaller diameter and provided with cast rim sections 1. There are two reinforcing side walls 2, 2′ forming substantially semi-disc like ribs for each rim section and being arranged at a right angle to the shaft, the bore of which plates is of slightly greater diameter than that of the shaft. In addition to the plates each half of the pulley is provided with four integral ribs 3, 3′, 4, 4′ extending inwardly from the rim and side walls, the inner ends of which extend beyond the inner edges of the central recesses of the walls 2, 2′ and the bore. The latter is of slightly smaller diameter than that of the shaft, so that the ends of the ribs sharply grip the shaft, when the two halves of the pulley are united by means of the bolt screws 6. The latter are placed in bracket portions 5, which are integral with the rim. In order that the bolt-screws 6 may be introduced, there are holes 1$^a$ provided in the rim, the area of which corresponds to the brackets 5. Openings 2$^a$ may be provided in the plates 2, 2′ for the purpose of lessening the weight of the pulley.

The pulley as shown in Figs. 3, 4 and 5 is designed for greater diameter, its wooden rim 7 being composed of segments as usual. As can be seen from the Figs. 3 and 4 each half of the pulley consists of a drum 10 bodily connected to the arms 8 and 8′. Each half drum is provided with four ribs 18, 18′, 19, 19′, the ends of which form the bore in the same manner as indicated for the pulley Figs. 1 and 2.

The arms are hollow and split by a fissure 11, their outer ends forming forks 12, 12', into which one segment 13 of the wooden rim 7 is inserted. The laps constituting the fork are fastened by screws 14 and then covered by the next segments, which are provided with recesses taking up the laps. As the edges of the laps are fitted closely and pressed against the smaller side-walls of the recesses, a very reliable and durable connection of arms and rim is obtained, which connection after the mounting is neither accessible nor visible. The elasticity of the split arms allows strong pressing of the laps against the segment inserted between them by the screws 14. The halves of the pulley are united by screws 15.

If such a pulley is desired to be used as a loose pulley, it may be modified as indicated by the Figs. 3ª, 4ª and 5. In such case the ribs 18, 18', 19, 19' are shortened and a bushing 20 is inserted between them, which preferably is composed of two parts. According to the invention this bushing is provided with ring-lubrication, consisting of an oil-chamber 21 and a lubricating ring 22. On the lateral sockets of this oil chamber the drum 10' with the arms is mounted.

The chamber 21 as shown in the drawing is split, but it may just as well be made of only one undivided piece of casting. In such case the two parts of the bushing are somewhat conical and driven sidewise into the oil chamber, thus tightening the casing. In order that the lubricating ring may be introduced in this undivided chamber, the latter may be provided with an opening of larger diameter than that of the bushing, this opening being closed by a flange of the brush. For clearness sake this form of the oil-chamber has not been shown in the drawing.

In the bushing 20 holes 23 are provided, through which the oil passes to the shaft.

In the pulley as shown in Figs. 6 and 7 the drum and the one pair of arms are made exactly in the same manner as has been described hitherto with one exception, that openings are provided in the drum, through which the other arms 24, 24' may be inserted from inside and pushed outwardly. The inner ends of these additional arms are enlarged so as to form extensions 25, 25', which by means of the screws 26 are secured to the drum. The outer ends of the additional arms are fastened on the wooden rim in exactly the same manner as has been explained above.

In the case as illustrated each additional arm consists of two hollow halves, each of them being secured to the casing by the screws 26, the nuts of which are placed in the inside of the casing.

Having now particularly described and ascertained the nature of my invention and in what manner the same is to be performed, I declare that what I claim is:

1. A sectional belt pulley composed of two sections each of which is cast in a single piece and consists of a semi-circular rim portion, semi-disc like side walls integral with the side edges thereof and provided with central recesses, pairs of opposed ribs extending inwardly from the rim and side walls and projecting slightly beyond the recesses in the side walls to form a shaft engaging bore, bracket portions formed in the rim portions of the sections and arranged opposite to each other and means engaging the bracket portions for clamping the pulley sections together and adapted to maintain the ribs in biting engagement with a shaft, substantially as and for the purposes set forth.

2. A pulley as claimed in claim 1 wherein split arms extend from the bracket portions and side walls of each of the pulley sections and terminate at their outer ends in seats, a wooden rim engaged with the seats and means engaging the seats and the wooden rim for effecting a clamping engagement between said parts.

In testimony whereof I affix my signature in presence of two witnesses.

HANS WOTTLE.

Witnesses:
 CARL NONDENHORY,
 M. KARL MAYEN.